US008273838B2

(12) United States Patent
Shan et al.

(10) Patent No.: US 8,273,838 B2
(45) Date of Patent: *Sep. 25, 2012

(54) PROPYLENE/α-OLEFINS BLOCK INTERPOLYMERS

(75) Inventors: Colin Li Pi Shan, Pearland, TX (US); Lonnie G. Hazlitt, Lake Jackson, TX (US); Yunwa Wilson Cheung, Pittsford, NY (US); Benjamin C. Poon, Pearland, TX (US); Phillip D. Hustad, Manvel, TX (US); Roger L. Kuhlman, Lake Jackson, TX (US); Edmund M. Carnahan, Fresno, TX (US); XiaoHua Qiu, Midland, MI (US); Angela N. Taha, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/686,444

(22) Filed: Mar. 15, 2007

(65) Prior Publication Data

US 2007/0219334 A1    Sep. 20, 2007

Related U.S. Application Data

(63) Continuation-in-part of application No. 11/377,725, filed on Mar. 15, 2006, now Pat. No. 7,504,347, which is a continuation-in-part of application No. PCT/US2005/008917, filed on Mar. 17, 2005.

(60) Provisional application No. 60/782,746, filed on Mar. 15, 2006, provisional application No. 60/553,906, filed on Mar. 17, 2004, provisional application No. 60/717,863, filed on Sep. 16, 2005.

(51) Int. Cl.
C08F 210/06    (2006.01)
C08F 4/659    (2006.01)

(52) U.S. Cl. ........ 526/348; 526/281; 526/336; 526/339; 526/348.2; 526/348.4; 526/348.6; 526/160; 526/161; 526/170; 526/172

(58) Field of Classification Search .................. 526/281, 526/336, 339, 348, 348.2, 348.4, 348.6, 160, 526/161, 170, 172
See application file for complete search history.

(56) References Cited

U.S. PATENT DOCUMENTS

| | | |
|---|---|---|
| 2,973,344 A | 2/1961 | Fasce |
| 2,997,432 A | 8/1961 | Koble et al. |
| 3,873,642 A | 3/1975 | Jezl |
| 4,146,492 A | 3/1979 | Cusano et al. |
| 4,299,931 A | 11/1981 | Coran et al. |
| 4,429,079 A | 1/1984 | Shibata et al. |
| 4,510,031 A | 4/1985 | Matsumura et al. |
| 4,780,228 A | 10/1988 | Gardiner et al. |
| 4,798,081 A | 1/1989 | Hazlitt et al. |
| 5,068,047 A | 11/1991 | Chung et al. |
| 5,266,626 A | 11/1993 | Hert et al. |
| 5,322,728 A | 6/1994 | Davey et al. |
| 5,391,629 A | 2/1995 | Turner et al. |
| 5,468,810 A | 11/1995 | Hayakawa et al. |
| 5,594,080 A | 1/1997 | Waymouth et al. |
| 5,597,881 A | 1/1997 | Winter et al. |
| 5,610,253 A | 3/1997 | Hatke et al. |
| 5,624,991 A | 4/1997 | Harada et al. |
| 5,733,980 A | 3/1998 | Cozewith et al. |
| 5,783,531 A | 7/1998 | Andrew et al. |
| 5,798,420 A | 8/1998 | Cozewith et al. |
| 5,868,984 A | 2/1999 | Winter et al. |
| 5,892,076 A | 4/1999 | Nickias |
| 5,916,953 A | 6/1999 | Jacoby et al. |
| 5,969,070 A | 10/1999 | Waymouth et al. |
| 5,994,255 A | 11/1999 | Nickias et al. |
| 6,008,262 A | 12/1999 | McKay et al. |
| 6,025,448 A | 2/2000 | Swindoll et al. |
| 6,096,668 A | 8/2000 | Abuto et al. |
| 6,114,457 A | 9/2000 | Markel et al. |
| 6,121,402 A | 9/2000 | Machida et al. |
| 6,136,937 A | 10/2000 | Lai et al. |
| 6,147,180 A | 11/2000 | Markel et al. |
| 6,160,029 A | 12/2000 | Chaudhary et al. |
| 6,187,424 B1 | 2/2001 | Kjellqvist et al. |
| 6,197,404 B1 | 3/2001 | Varona |
| 6,262,203 B1 | 7/2001 | Chien et al. |
| 6,362,252 B1 | 3/2002 | Prutkin |

(Continued)

FOREIGN PATENT DOCUMENTS

EP        0 274 906 A2    7/1988

(Continued)

OTHER PUBLICATIONS

International Search Report (PCT/US2007/064036), dated Aug. 20, 2007.

*Primary Examiner* — Roberto Rabago
(74) *Attorney, Agent, or Firm* — Whyte Hirschboeck Dudek SC

(57) ABSTRACT

Embodiments of the invention provide a class of propylene/α-olefin block interpolymers. The propylene/α-olefin interpolymers are characterized by an average block index, ABI, which is greater than zero and up to about 1.0 and a molecular weight distribution, $M_w/M_n$, greater than about 1.3. Preferably, the block index is from about 0.2 to about 1. In addition or alternatively, the block propylene/α-olefin interpolymer is characterized by having at least one fraction obtained by Temperature Rising Elution Fractionation ("TREF"), wherein the fraction has a block index greater than about 0.3 and up to about 1.0 and the propylene/α-olefin interpolymer has a molecular weight distribution, $M_w/M_n$, greater than about 1.3.

31 Claims, No Drawings

U.S. PATENT DOCUMENTS

| | | | |
|---|---|---|---|
| 6,455,638 B2 | 9/2002 | Laughner et al. | |
| 6,537,472 B2 | 3/2003 | Masubuchi | |
| 6,566,446 B1 | 5/2003 | Parikh et al. | |
| 6,566,544 B1 | 5/2003 | Waymouth et al. | |
| 6,815,023 B1 | 11/2004 | Tatarka et al. | |
| 7,005,395 B2 | 2/2006 | Zafiroglu et al. | |
| 7,355,089 B2 | 4/2008 | Chang et al. | |
| 7,498,282 B2 * | 3/2009 | Patel et al. | 442/398 |
| 7,504,347 B2 * | 3/2009 | Poon et al. | 442/361 |
| 7,514,517 B2 * | 4/2009 | Hoenig et al. | 526/348.6 |
| 7,524,911 B2 * | 4/2009 | Karjala et al. | 526/348 |
| 7,557,147 B2 * | 7/2009 | Martinez et al. | 521/144 |
| 7,579,408 B2 * | 8/2009 | Walton et al. | 525/191 |
| 7,608,668 B2 * | 10/2009 | Li Pi Shan et al. | 525/240 |
| 7,666,918 B2 * | 2/2010 | Prieto et al. | 521/144 |
| 7,671,106 B2 * | 3/2010 | Markovich et al. | 521/144 |
| 7,671,131 B2 * | 3/2010 | Hughes et al. | 525/191 |
| 7,714,071 B2 * | 5/2010 | Hoenig et al. | 525/191 |
| 7,741,397 B2 * | 6/2010 | Liang et al. | 524/423 |
| 7,786,216 B2 * | 8/2010 | Soediono et al. | 525/191 |
| 7,795,321 B2 * | 9/2010 | Cheung et al. | 521/142 |
| 2003/0027954 A1 | 2/2003 | Becke et al. | |
| 2003/0195128 A1 | 10/2003 | Deckman et al. | |
| 2003/0204017 A1 * | 10/2003 | Stevens et al. | 525/53 |
| 2003/0216518 A1 | 11/2003 | Tau et al. | |
| 2004/0082750 A1 | 4/2004 | Tau et al. | |
| 2004/0092662 A1 | 5/2004 | Goto et al. | |
| 2004/0121922 A1 | 6/2004 | Okada et al. | |
| 2004/0158011 A1 | 8/2004 | Jain et al. | |
| 2004/0192147 A1 | 9/2004 | Smith et al. | |
| 2005/0009993 A1 | 1/2005 | Morioka et al. | |
| 2006/0030667 A1 | 2/2006 | Yalvac et al. | |
| 2006/0198983 A1 | 9/2006 | Patel et al. | |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199887 A1 | 9/2006 | Liang et al. | |
| 2006/0199896 A1 | 9/2006 | Walton et al. | |
| 2006/0199905 A1 | 9/2006 | Hughes et al. | |
| 2006/0199906 A1 | 9/2006 | Walton et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 * | 9/2006 | Fuchs et al. | 525/240 |
| 2006/0199914 A1 * | 9/2006 | Harris et al. | 525/242 |
| 2006/0199930 A1 | 9/2006 | Shan et al. | |
| 2006/0199931 A1 | 9/2006 | Poon et al. | |
| 2006/0205833 A1 | 9/2006 | Martinez et al. | |
| 2006/0211819 A1 | 9/2006 | Hoenig et al. | |
| 2007/0010616 A1 * | 1/2007 | Kapur et al. | 524/525 |
| 2007/0066756 A1 * | 3/2007 | Poon et al. | 525/191 |
| 2008/0299857 A1 | 12/2008 | Harding et al. | |

FOREIGN PATENT DOCUMENTS

| | | |
|---|---|---|
| EP | 0 877 050 | 11/1998 |
| EP | 1 026 184 | 8/2000 |
| EP | 0 958 313 B1 | 9/2002 |
| EP | 1 262 498 A2 | 12/2002 |
| JP | 2002-206007 A | 7/2002 |
| JP | 2004-204058 A | 7/2004 |
| WO | WO 95/27745 A1 | 10/1995 |
| WO | WO 95/27746 A1 | 10/1995 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 02/079322 | 10/2002 |
| WO | WO 03/014046 A1 | 2/2003 |
| WO | WO 2005/090426 * | 9/2005 |
| WO | WO 2005/090426 A1 * | 9/2005 |
| WO | WO 2005/090427 A2 | 9/2005 |
| WO | WO 2006/101595 A1 | 9/2006 |
| WO | WO 2006/101966 A1 | 9/2006 |

* cited by examiner

PROPYLENE/α-OLEFINS BLOCK INTERPOLYMERS

CROSS-REFERENCE TO RELATED APPLICATIONS

This application claims priority to U.S. Provisional Application No. 60/782,746, filed Mar. 15, 2006. For purposes of United States patent practice, the content of the provisional application No. 60/782,746 is herein incorporated by reference in their its entirety.

This application also is a continuation-in-part of U.S. patent application Ser. No. 11/377,725 filed on Mar. 15, 2006 (now U.S. Pat. No. 7,504,347) which is a continuation-in-part of international application PCT/US2005/008917 filed on Mar. 17, 2005 which claims priority to U.S. provisional application No. 60/553,906 filed on Mar. 17, 2004. Application Ser. No. 11/377,725 also claims priority to U.S. provisional application No. 60/717,863, filed on Sep. 16, 2005.

FIELD OF THE INVENTION

This invention relates to propylene/α-olefin block interpolymers and products made from the block interpolymers.

BACKGROUND OF THE INVENTION

Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different way and be repeated multiply. It may further comprise additional blocks of different type. Multi-block copolymers can be either linear multi-block or multi-block star polymers (in which all blocks bond to the same atom or chemical moiety).

A block copolymer is created when two or more polymer molecules of different chemical composition are covalently bonded in an end-to-end fashion. While a wide variety of block copolymer architectures are possible, most block copolymers involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers, are also possible and may have commercial importance.

One method to make block copolymers is to produce a "living polymer". Unlike typical Ziegler-Natta polymerization processes, living polymerization processes involve only initiation and propagation steps and essentially lack chain terminating side reactions. This permits the synthesis of predetermined and well-controlled structures desired in a block copolymer. A polymer created in a "living" system can have a narrow or extremely narrow distribution of molecular weight and be essentially monodisperse (i.e., the molecular weight distribution is essentially one). Living catalyst systems are characterized by an initiation rate which is on the order of or exceeds the propagation rate, and the absence of termination or transfer reactions. In addition, these catalyst systems are characterized by the presence of a single type of active site. To produce a high yield of block copolymer in a polymerization process, the catalyst must exhibit living characteristics to a substantial extent.

Butadiene-isoprene block copolymers have been synthesized via anionic polymerization using the sequential monomer addition technique. In sequential addition, a certain amount of one of the monomers is contacted with the catalyst. Once a first such monomer has reacted to substantial extinction forming the first block, a certain amount of the second monomer or monomer species is introduced and allowed to react to form the second block. The process may be repeated using the same or other anionically polymerizable monomers. However, propylene and other α-olefins, such as ethylene, butene, 1-octene, etc., are not directly block polymerizable by anionic techniques.

Therefore, there is an unfulfilled need for block copolymers which are based on propylene and α-olefins. There is also a need for a method of making such block copolymers.

SUMMARY OF THE INVENTION

The aforementioned needs are met by various aspects of the invention. In one aspect, the invention relates to a propylene/α-olefin interpolymer comprising polymerized units of propylene and α-olefin, wherein the interpolymer is characterized by an average block index greater than zero and up to about 1.0 and a molecular weight distribution, $M_w/M_n$, greater than about 1.3. In another aspect, the invention relates to a propylene/α-olefin interpolymer comprising polymerized units of propylene and α-olefin, wherein the average block index is greater than 0 but less than about 0.4 and a molecular weight distribution, $M_w/M_n$, greater than about 1.3. Preferably, the interpolymer is a linear, multi-block copolymer with at least three blocks. Also preferably, the propylene content in the interpolymer is at least 50 mole percent.

In some embodiments, the average block index of the interpolymer is in the range from about 0.1 to about 0.3, from about 0.4 to about 1.0, from about 0.3 to about 0.7, from about 0.6 to about 0.9, or from about 0.5 to about 0.7. In other embodiments, the interpolymer has a density of less than about 0.90 g/cc, such as from about 0.85 g/cc to about 0.88 g/cc. In some embodiments, the α-olefin in the propylene/α-olefin interpolymer is styrene, ethylene, 1-butene, 1-hexene, 1-octene, 4-methyl-1-pentene, norbornene, 1-decene, 1,5-hexadiene, or a combination thereof. In other embodiments, the molecular weight distribution, $M_w/M_n$, is greater than about 1.5 or greater than about 2.0. It can also range from about 2.0 to about 8 or from about 1.7 to about 3.5.

In yet another aspect, the invention relates to a propylene/α-olefin interpolymer comprising polymerized units of propylene and α-olefin, the interpolymer characterized by having at least one fraction obtained by Temperature Rising Elution Fractionation ("TREF"), wherein the fraction has a block index greater than about 0.3 and up to about 1.0 and the propylene/α-olefin interpolymer has a molecular weight distribution, $M_w/M_n$, greater than about 1.3. In still anther aspect, the invention relates to a propylene/α-olefin interpolymer comprising polymerized units of propylene and α-olefin, the interpolymer characterized by having at least one fraction obtained by TREF, wherein the fraction has a block index greater than about 0 and up to about 0.4 and the propylene/α-olefin interpolymer has a molecular weight distribution, $M_w/M_n$, greater than about 1.3. In some embodiments, the block index of the fraction is greater than about 0.4, greater than about 0.5, greater than about 0.6, greater than about 0.7, greater than about 0.8, or greater than about 0.9.

The interpolymer comprises one or more hard segments and one or more soft segments. Preferably, the hard segments comprise at least 98% of propylene by weight, and the soft segments comprise less than 95%, preferably less than 92%, of propylene by weight. In some embodiments, the hard segments are present in an amount from about 5% to about 85% by weight of the interpolymer. In other embodiments, the interpolymer comprises at least 5 or at least 10 hard and soft segments connected in a linear fashion to form a linear chain. Preferably, the hard segments and soft segments are randomly distributed along the chain. In some embodiments, neither the soft segments nor the hard segments include a tip segment (which is different by chemical composition than the rest of the segments).

Methods of making the interpolymers are also provided herein. Additional aspects of the invention and characteristics and properties of various embodiments of the invention become apparent with the following description.

DESCRIPTION OF EMBODIMENTS OF THE INVENTION

General Definitions

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "propylene/α-olefin interpolymer" refers to polymers with propylene being the majority mole fraction of the whole polymer. Preferably, propylene comprises at least 50 mole percent of the whole polymer, more preferably at least 70 mole percent, at least 80 mole percent, or at least 90 mole percent, with the reminder of the whole polymer comprising at least another comonomer. For propylene/ethylene copolymers, the preferred composition includes a propylene content greater than about 90 mole percent with a ethylene content of equal to or less than about 10 mole percent. In some embodiments, the propylene/α-olefin interpolymers do not include those produced in low yields or in a minor amount or as a by-product of a chemical process. While the propylene/α-olefin interpolymers can be blended with one or more polymers, the as-produced propylene/α-olefin interpolymers are substantially pure and constitute the major component of a polymerization process.

The term "crystalline" if employed, refers to a polymer or a segment that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (also referred to as "blocks") preferably joined in a linear manner, that is, a polymer comprising chemically differentiated units which are joined end-to-end with respect to polymerized propylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or $M_w/M_n$), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1. When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R_U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a new class of propylene/α-olefin block interpolymers (hereinafter "inventive polymer", "propylene/1-olefin interpolymers", or variations thereof). The propylene/α-olefin interpolymers comprise propylene and one or more copolymerizable α-olefin comonomers in polymerized form, characterized by multiple (i.e., two or more) blocks or segments of two or more polymerized monomer units differing in chemical or physical properties (block interpolymer), preferably a multi-block copolymer. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. "Hard" segments refer to blocks of polymerized units in which propylene is present in an amount greater than 95 weight percent, and preferably greater than 98 weight percent. In other words, the comonomer content in the hard segments is less than 5 weight percent, and preferably less than 2 weight percent. In some embodiments, the hard segments comprises all or substantially all propylene. "Soft" segments, on the other hand, refer to blocks of polymerized units in which the comonomer content is greater than 5 weight percent, preferably greater than 8 weight percent, greater than 10 weight percent, or greater than 15 weight percent. In some embodiments, the comonomer content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along the polymer chain. In other words, the block copolymers do not have a structure like:

AAA-AA-BBB-BB

In other embodiments, the block copolymers do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

The propylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive propylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (i.e., analytical TREF) elution temperature for the ith fraction (preferably expressed in Kelvin), $P_X$ is the propylene mole fraction for the ith fraction, which can be measured by NMR or IR as described below. $P_{AB}$ is the propylene mole fraction of the whole propylene/α-olefin interpolymer (before fractionation), which also can be measured by NMR or IR. $T_A$ and $P_A$ are the ATREF elution temperature and the propylene mole fraction for pure "hard segments" (which refer to the crystalline segments of the interpolymer). As an approximation or for polymers where the "hard segment" composition is unknown, the $T_A$ and $P_A$ values are set to those for isotactic polypropylene homopolymer catalyzed by a Ziegler-Natta catalyst.

$T_{AB}$ is the ATREF elution temperature for a random copolymer of the same composition and preferably with the same tacticity and regio defects that produces the hard segments within the block copolymer (having a propylene mole fraction of $P_{AB}$) and molecular weight as the inventive copolymer. $T_{AB}$ can be calculated from the mole fraction of propylene (measured by NMR) using the following equation:

$$Ln\ P_{AB} = \alpha/T_{AB} + \beta$$

where α and β are two constants which can be determined by a calibration using a number of well characterized preparative TREF fractions of a broad composition random copolymer and/or well characterized random propylene copolymers with narrow composition. Ideally, the TREF fractions have been prepared from random propylene copolymers produced with substantially the same or similar catalyst as the hard segments expected within the block copolymer. This is important to account for slight temperature differences that result in the propylene crystallinity due to defects from tacticity and regio insertion errors. If such random copolymers are not available, TREF fractions from random copolymers produced by a Ziegler-Natta catalyst known to produce highly isotactic polypropylene can be used. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible.

$T_{XO}$ is the ATREF temperature for a random copolymer of the same composition (i.e., the same comonomer type and content) and the same molecular weight and having a propylene mole fraction of $P_X$. $T_{XO}$ can be calculated from $LnP_X = \alpha/T_{XO} + \beta$ from a measured $P_X$ mole fraction. Conversely, $P_{XO}$ is the propylene mole fraction for a random copolymer of the same composition (i.e., the same comonomer type and content) and the same molecular weight and having an ATREF temperature of $T_X$, which can be calculated from $Ln\ P_{XO} = \alpha/T_X + \beta$ using a measured value of $T_X$.

Once the block index (BI) for each preparative TREF fraction is obtained, the weight average block index, ABI, for the whole polymer can be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive propylene/α-olefin interpolymer is that the inventive propylene/1-olefin interpolymer comprises at least one polymer fraction which can be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0.

In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

In addition to an average block index and individual fraction block indices, the propylene/α-olefin interpolymers are characterized by one or more of the properties described as follows.

In one aspect, the propylene/α-olefin interpolymers used in embodiments of the invention have a $M_w/M_n$ from about 1.7 to about 3.5 and at least one melting point, $T_m$, in degrees Celsius and α-olefin content, in weight %, wherein the numerical values of the variables correspond to the relationship:

$$T_m \geq -2.909(\text{wt \% α-olefin}) + 150.57, \text{ and preferably}$$

$$T_m \geq -2.909(\text{wt \% α-olefin}) + 145.57, \text{ and more preferably}$$

$$T_m \geq -2.909(\text{wt \% α-olefin}) + 141.57$$

Unlike the traditional random copolymers of propylene/α-olefins whose melting points decrease with decreasing densities, the inventive interpolymers exhibit melting points substantially independent of the α-olefin content, particularly when α-olefin content is between about 2 to about 15 weight %.

In yet another aspect, the propylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random propylene interpolymer fraction eluting between the same temperatures, wherein the comparable random propylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the propylene/α-olefin interpolymers are characterized by an elastic recovery, Re, in percent at 300 percent strain and 1 cycle measured on a compression-molded film of a propylene/α-olefin interpolymer, and has a density, d, in grams/cubic centimeter, wherein the numerical values of Re and d satisfy the following relationship when propylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

In some embodiments, the propylene/α-olefin interpolymers have a tensile strength above 10 MPa, preferably a tensile strength $\geq 11$ MPa, more preferably a tensile strength $\geq 13$ MPa and/or an elongation at break of at least 600 percent, more preferably at least 700 percent, highly preferably at least 800 percent, and most highly preferably at least 900 percent at a crosshead separation rate of 11 cm/minute.

In other embodiments, the propylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the propylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the propylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the propylene/α-olefin interpolymers comprise, in polymerized form, at least 50 mole percent propylene and have a 70° C. compression set of less than 80 percent, preferably less than 70 percent or less than 60 percent, most preferably less than 40 to 50 percent and down to close to zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the inventive block interpolymers have additional characteristics or properties. In one aspect, the interpolymers, preferably comprising propylene and one or more copolymerizable comonomers in polymerized form, are characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random propylene interpolymer fraction eluting between the same temperatures, wherein said comparable random propylene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising propylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random propylene interpolymer peak at the same elution temperature and expanded using a full width/half maximum (FWHM) area calculation, wherein said comparable random propylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infrared detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random propylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymer has higher molar comonomer content than a corresponding comparable interpolymer.

Preferably, for interpolymers of propylene and ethylene, the block interpolymer has a comonomer content of the TREF fraction eluting between 40 and 130° C. greater than or equal to the quantity (−0.1236) T+13.337, more preferably greater than or equal to the quantity (−0.1236) T+14.837, where T is the numerical value of the peak elution temperature of the TREF fraction being compared, measured in ° C.

In addition to the above aspects and properties described herein, the inventive polymers can be characterized by one or more additional characteristics. In one aspect, the inventive polymer is an olefin interpolymer, preferably comprising propylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random propylene interpolymer fraction eluting between the same temperatures, wherein said comparable random propylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of propylene and at least one α-olefin, especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.1236)T+13.337, more preferably greater than or equal to the quantity (−0.1236) T+14.337, and most preferably greater than or equal to the quantity (−0.1236)T+13.837, where T is the numerical value of the peak ATREF elution temperature of the TREF fraction being compared, measured in ° C.

In still another aspect, the inventive polymer is an olefin interpolymer, preferably comprising propylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising propylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion}(J/gm) \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

Heat of fusion(J/gm)≧(1.1312)(ATREF elution temperature in Celsius)+22.97.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known propylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

It should be noted that while the TREF fractions in the above description are obtained in a 5° C. increment, other temperature increments are possible. For instance, a TREF fraction could be in a 4° C. increment, a 3° C. increment, a 2° C. increment, or 1° C. increment.

For copolymers of propylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) a propylene content of at least 50 weight percent; (4) a glass transition temperature, $T_g$, of less than −5° C., more preferably less than −15° C., and/or (5) one and only one $T_m$.

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. that is characteristic of block copolymers, and heretofore unknown for an olefin copolymer, especially a copolymer of propylene and one or more ethylene or $C_{4-8}$ aliphatic α-olefins. (By the term "relatively flat" in this context is meant that log G' (in Pascals) decreases by less than one order of magnitude between 50 and 100° C., preferably between 0 and 100° C.).

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 $mm^3$.

Additionally, the propylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the propylene/α-olefin interpolymers have a melt index, 12, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the propylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 $g/cm^3$ and preferably for propylene containing polymers from 0.85 $g/cm^3$ to 0.90 $g/cm^3$. In certain embodiments, the density of the propylene/α-olefin polymers ranges from 0.860 to 0.89 $g/cm^3$ or 0.865 to 0.885 $g/cm^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting propylene and optionally one or more addition polymerizable monomers other than propylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, U.S. Pat. No. 6,953,764 and No. 6,960,635, and WO 04/24740

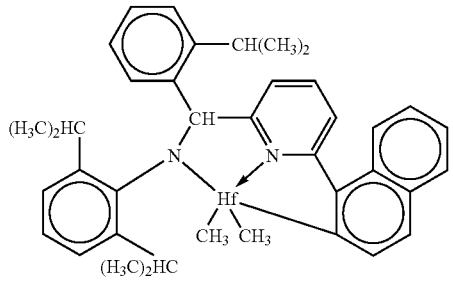

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, U.S. Pat. No. 6,953,764 and No. 6,960,635, and WO 04/24740.

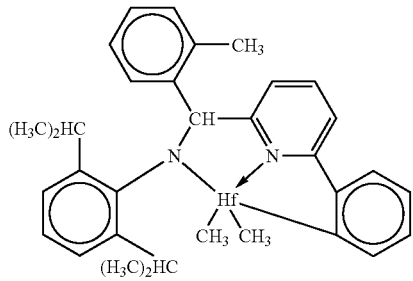

Catalyst (A3) is bis[N,N'''-(2,4,6-tri(methylphenyl)amido)ethylenediamine]hafnium dibenzyl.

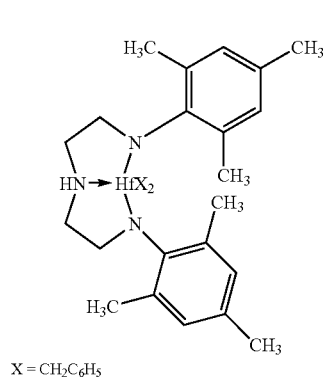

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of U.S. Pat. No. 6,897,276.

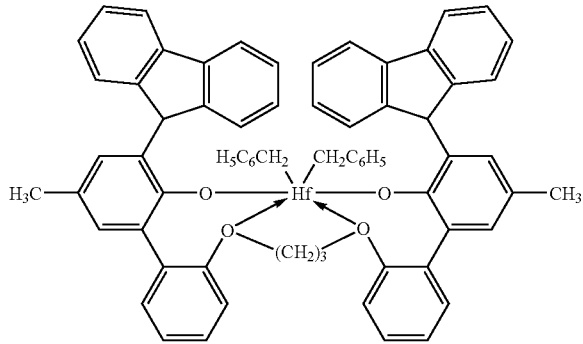

Catalyst (B1) is 1,2-bis-(3,5-di-t-butylphenylene)(1-(N-(1-methylethyl)immino)methyl)(2-oxoyl)zirconium dibenzyl

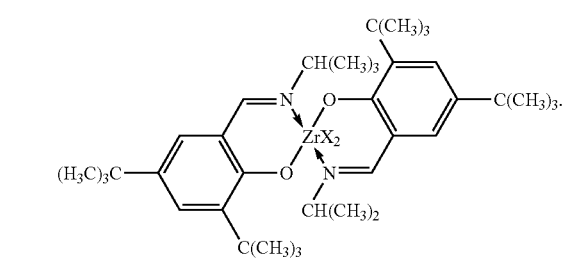

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl

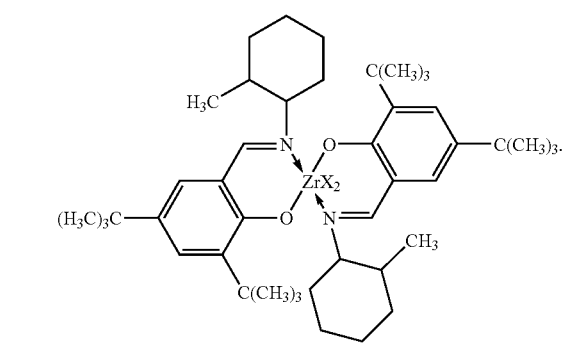

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

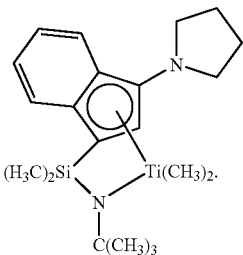

Catalyst (C2) is (t-butylamido)di(4-methylphenyl)(2-methyl-1,2,3,3a,7a-η-inden-1-yl)silanetitanium dimethyl prepared substantially according to the teachings of U.S. Pat. No. 6,825,295:

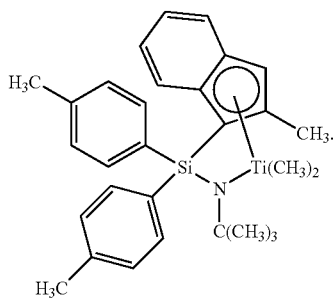

Catalyst (C3) is (t-butylamido)di(4-methylphenyl)(2-methyl-1,2,3,3a,8a-η-s-indacen-1-yl)silanetitanium dimethyl prepared substantially according to the teachings of U.S. Pat. No. 6,825,295:

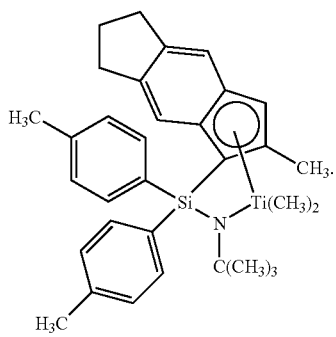

Catalyst (D1) is bis(dimethyldisiloxane)(indene-1-yl)zirconium dichloride available from Sigma-Aldrich:

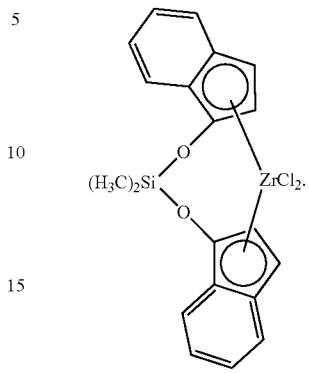

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis (trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{4-20}$ olefin or cycloolefin, and most especially a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is, the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of propylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The propylene α-olefin interpolymers used in the embodiments of the invention are preferably interpolymers of propylene with at least one ethylene or $C_4$-$C_{20}$ α-olefin. Copolymers of propylene and an ethylene or $C_4$-$C_{20}$ α-olefin are especially preferred. The interpolymers may further comprise $C_4$-$C_{18}$ diolefin and/or alkenylbenzene. Suitable unsaturated comonomers useful for polymerizing with propylene include, for example, ethylenically unsaturated monomers, conjugated or nonconjugated dienes, polyenes, alkenylbenzenes, etc. Examples of such comonomers include ethylene or $C_4$-$C_{20}$ α-olefins such as, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While propylene/α-olefin interpolymers are preferred polymers, other propylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are ethylene or $C_4$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising propylene and styrene can be prepared by following the teachings herein. Optionally, copolymers comprising propylene, styrene and a $C_4$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7- octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_4$-$C_{20}$ α-olefin, especially propylene, and optionally one or more diene monomers. Preferred α-olefins for use in this embodiment of the present invention are designated by the formula $CH_2=CHR^*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have a propylene content of from 50 to 97 percent, a diene content of from 0.1 to 10 percent, and an α-olefin content of from 3 to 50 percent, based on the total weight of the polymer. Further preferably, the multi-block elastomeric polymers have a propylene content of from 60 to 97 percent, a diene content of from 0.1 to 10 percent, and an α-olefin content of from 3 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have a propylene content from 65 to 75 percent, a diene content from 0 to 6 percent, and an α-olefin content from 20 to 35 percent.

The propylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to a propylene/α-olefin interpolymer, or may be copolymerized with propylene and an optional additional comonomer to form an interpolymer of propylene, the functional comonomer and optionally other comonomer(s). Means for grafting functional groups onto polypropylene are described for example in U.S. Pat. Nos. 4,762,890, 4,927,888, and 4,950,541, the disclosures of these patents are incorporated herein by reference in their entirety. One particularly useful functional group is maleic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

More on Block Index

Random copolymers satisfy the following relationship. See P. J. Flory, *Trans. Faraday Soc.*, 51, 848 (1955), which is incorporated by reference herein in its entirety.

$$\frac{1}{T_m} - \frac{1}{T_m^0} = -\left(\frac{R}{\Delta H_u}\right)\ln P \qquad (1)$$

In Equation 1, the mole fraction of crystallizable monomers, P, is related to the melting temperature, $T_m$, of the copolymer and the melting temperature of the pure crystallizable homopolymer, $T_m^0$. The equation is similar to the relationship for the natural logarithm of the mole fraction of propylene as a function of the reciprocal of the ATREF elution temperature (° K.).

The relationship of propylene mole fraction to ATREF peak elution temperature and DSC melting temperature for various homogeneously branched copolymers of similar tacticity and region defects is analogous to Flory's equation. Similarly, preparative TREF fractions of nearly all propylene random copolymers and random copolymer blends of similar tacticity and regio defects likewise fall on this line, except for small molecular weight effects.

According to Flory, if P, the mole fraction of propylene, is equal to the conditional probability that one propylene unit will precede or follow another propylene unit, then the polymer is random. On the other hand if the conditional probability that any 2 propylene units occur sequentially is greater than P, then the copolymer is a block copolymer. The remaining case where the conditional probability is less than P yields alternating copolymers.

The mole fraction of isotactic propylene in random copolymers primarily determines a specific distribution of propylene segments whose crystallization behavior in turn is governed by the minimum equilibrium crystal thickness at a given temperature. Therefore, the copolymer melting and TREF crystallization temperatures of the inventive block copolymers are related to the magnitude of the deviation from the random relationship, and such deviation is a useful way to quantify how "blocky" a given TREF fraction is relative to its random equivalent copolymer (or random equivalent TREF fraction). The term "blocky" refers to the extent a particular polymer fraction or polymer comprises blocks of polymerized monomers or comonomers. There are two random equivalents, one corresponding to constant temperature and one corresponding to constant mole fraction of propylene. These form the sides of a right triangle.

The point $(T_X, P_X)$ represents a preparative TREF fraction, where the ATREF elution temperature, $T_X$, and the NMR propylene mole fraction, $P_X$, are measured values. The propylene mole fraction of the whole polymer, $P_{AB}$, is also measured by NMR. The "hard segment" elution temperature and mole fraction, $(T_A, P_A)$, can be estimated or else set to that of an isotactic propylene homopolymer (prepared by a stereospecific Ziegler-Natta catalyst) for propylene copolymers. The $T_{AB}$ value corresponds to the calculated random copolymer equivalent ATREF elution temperature based on the measured $P_{AB}$. From the measured ATREF elution temperature, $T_X$, the corresponding random propylene mole fraction, $P_{XO}$, can also be calculated. The square of the block index is defined to be the ratio of the area of the $(P_X, T_X)$ triangle and the $(T_A, P_{AB})$ triangle. Since the right triangles are similar, the ratio of areas is also the squared ratio of the distances from $(T_A, P_{AB})$ and $(T_X, P_X)$ to the random line. In addition, the similarity of the right triangles means the ratio of the lengths of either of the corresponding sides can be used instead of the areas.

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

It should be noted that the most perfect block distribution would correspond to a whole polymer with a single eluting fraction at the point $(T_A, P_{AB})$, because such a polymer would preserve the propylene segment distribution in the "hard segment", yet contain all the available octene (presumably in runs that are nearly identical to those produced by the soft segment catalyst). In most cases, the "soft segment" will not crystallize in the ATREF (or preparative TREF).

Applications and End Uses

The inventive propylene/α-olefin block interpolymers can be used in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the inventive polymers, include blends with other natural or synthetic polymers, additives, reinforcing agents, ignition resistant additives, antioxidants, stabilizers, colorants, extenders, crosslinkers, blowing agents, and plasticizers. Of particular utility are multi-component fibers such as core/sheath fibers, having an outer surface layer, comprising at least in part, one or more polymers according to embodiments of the invention.

Fibers that may be prepared from the inventive polymers or blends include staple fibers, tow, multicomponent, sheath/core, twisted, and monofilament. Suitable fiber forming processes include spinbonded, melt blown techniques, as disclosed in U.S. Pat. Nos. 4,430,563, 4, 663,220, 4,668,566, and 4,322,027, gel spun fibers as disclosed in U.S. Pat. No. 4,413,110, woven and nonwoven fabrics, as disclosed in U.S. Pat. No. 3,485,706, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The new polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing.

Dispersions, both aqueous and non-aqueous, can also be formed using the inventive polymers or formulations comprising the same. Frothed foams comprising the invented polymers can also be formed, as disclosed in PCT application No. PCT/US2004/027593, filed Aug. 25, 2004, and published as WO2005/021622. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Additives and adjuvants may be included in any formulation comprising the inventive polymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the invention.

Suitable polymers for blending with the polymers according to embodiments of the invention include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polypropylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538, 070, 6,566,446, 5,844,045, 5,869,575, and 6,448,341), propylene-vinyl acetate (EVA), propylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil Chemical Company can also be useful as components in blends comprising the inventive polymers.

Suitable end uses for the foregoing products include elastic films and fibers; soft touch goods, such as tooth brush handles and appliance handles; gaskets and profiles; adhesives (including hot melt adhesives and pressure sensitive adhesives);

footwear (including shoe soles and shoe liners); auto interior parts and profiles; foam goods (both open and closed cell); impact modifiers for other thermoplastic polymers such as high density polypropylene, isotactic polypropylene, or other olefin polymers; coated fabrics; hoses; tubing; weather stripping; cap liners; flooring; and viscosity index modifiers, also known as pour point modifiers, for lubricants.

In some embodiments, thermoplastic compositions comprising a thermoplastic matrix polymer, especially isotactic polypropylene, and an elastomeric multi-block copolymer of propylene and a copolymerizable comonomer according to embodiments of the invention, are uniquely capable of forming core-shell type particles having hard crystalline or semi-crystalline blocks in the form of a core surrounded by soft or elastomeric blocks forming a "shell" around the occluded domains of hard polymer. These particles are formed and dispersed within the matrix polymer by the forces incurred during melt compounding or blending. This highly desirable morphology is believed to result due to the unique physical properties of the multi-block copolymers which enable compatible polymer regions such as the matrix and higher comonomer content elastomeric regions of the multi-block copolymer to self-assemble in the melt due to thermodynamic forces. Shearing forces during compounding are believed to produce separated regions of matrix polymer encircled by elastomer. Upon solidifying, these regions become occluded elastomer particles encased in the polymer matrix.

Particularly desirable blends are thermoplastic polyolefin blends (TPO), thermoplastic elastomer blends (TPE), thermoplastic vulcanizates (TPV) and styrenic polymer blends. TPE and TPV blends may be prepared by combining the invented multi-block polymers, including functionalized or unsaturated derivatives thereof with an optional rubber, including conventional block copolymers, especially an SBS block copolymer, and optionally a crosslinking or vulcanizing agent. TPO blends are generally prepared by blending the invented multi-block copolymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779.

Suitable conventional block copolymers for this application desirably possess a Mooney viscosity (ML 1+4 @ 100° C.) in the range from 10 to 135, more preferably from 25 to 100, and most preferably from 30 to 80. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blends may be prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, calenders, and the like. The sequence of mixing and method may depend on the final composition. A combination of Banbury batch mixers and continuous mixers may also be employed, such as a Banbury mixer followed by a mill mixer followed by an extruder.

Typically, a TPE or TPV composition will have a higher loading of cross-linkable polymer (typically the conventional block copolymer containing unsaturation) compared to TPO compositions. Generally, for TPE and TPV compositions, the weight ratio of block copolymer to multi-block copolymer may be from about 90:10 to 10:90, more preferably from 80:20 to 20:80, and most preferably from 75:25 to 25:75. For TPO applications, the weight ratio of multi-block copolymer to polyolefin may be from about 49:51 to about 5:95, more preferably from 35:65 to about 10:90. For modified styrenic polymer applications, the weight ratio of multi-block copolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend that a person skilled in this art may consult if necessary.

The blend compositions may contain processing oils, plasticizers, and processing aids. Rubber processing oils having a certain ASTM designation and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV, ozone, and oxidation, compared to mostly or highly saturated rubbers. In applications such as tires made from compositions containing higher concentrations of diene based rubbers, it is known to incorporate carbon black to improve rubber stability, along with anti-ozone additives and anti-oxidants. Multi-block copolymers according to the present invention possessing extremely low levels of unsaturation, find particular application as a protective surface layer (coated, coextruded or laminated) or weather resistant film adhered to articles formed from conventional diene elastomer modified polymeric compositions.

For conventional TPO, TPV, and TPE applications, carbon black is the additive of choice for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 cm$^3$/100 g. Generally, smaller particle sized carbon blacks are employed, to the extent cost considerations permit. For many such applications the present multi-block copolymers and blends thereof require little or no carbon black, thereby allowing considerable design freedom to include alternative pigments or no pigments at all. Multi-hued tires or tires matching the color of the vehicle are one possibility.

Compositions, including thermoplastic blends according to embodiments of the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051,681.

For some compositions, additional mixing process may be employed to pre-disperse the anti-oxidants, anti-ozonants, carbon black, UV absorbers, and/or light stabilizers to form a masterbatch, and subsequently to form polymer blends there from.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer", Vol. 74, No 3, July-August 2001.

When the multi-block copolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 percent.

The multi-block copolymers according to embodiments of the invention as well as blends thereof possess improved processability compared to prior art compositions, due, it is believed, to lower melt viscosity. Thus, the composition or blend demonstrates an improved surface appearance, especially when formed into a molded or extruded article. At the same time, the present compositions and blends thereof uniquely possess improved melt strength properties, thereby allowing the present multi-block copolymers and blends thereof, especially TPO blends, to be usefully employed in foam and thermoforming applications where melt strength is currently inadequate.

Thermoplastic compositions according to embodiments of the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane based or other coupling agents may also be employed for better filler bonding.

The thermoplastic compositions according to embodiments of the invention, including the foregoing blends, may be processed by conventional molding techniques such as injection molding, extrusion molding, thermoforming, slush molding, over molding, insert molding, blow molding, and other techniques. Films, including multi-layer films, may be produced by cast or tentering processes, including blown film processes.

In addition to the above, the block propylene/α-olefin interpolymers also can be used in a manner that is described in the following U.S. provisional application, the disclosures of which and their continuations, divisional applications and continuation-in-part applications are incorporated by reference herein in their entirety: "Fibers Made from Copolymers of Propylene/α-Olefins", U.S. Ser. No. 60/717,863, filed on Sep. 16, 2005;

Testing Methods

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing. Additional information regarding this technique is taught by Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982).

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 190° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 230° C. and held isothermal for 3 minutes in order to remove any previous thermal history. The sample is then cooled to −90° C. at 10° C./min cooling rate and held at −90° C. for 3 minutes. The sample is then heated to 230° C. at 10° C./min. heating rate. The cooling and second heating curves are recorded.

The DSC melting peak is measured as the maximum in heat flow rate (W/g) with respect to the linear baseline drawn between the beginning and end of melting. The heat of fusion is measured as the area under the melting curve between the beginning and the end of melting using a linear baseline. For polypropylene homopolymers and copolymers, the beginning of melting is typically observed between 0 and −40° C.

The resulting enthalpy curves are analyzed for peak melting temperature, onset, and peak crystallization temperatures, heat of fusion and heat of crystallization, and any other DSC analyses of interest.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984), incorporated herein by reference) and polystyrene (as described by E. P. Otocka, R. J. Roe, N.Y. Hellman, P. M. Muglia, Macromolecules, 4, 507 (1971) incorporated herein by reference) in the Mark-Houwink equation:

$$\{\eta\} = KM^a$$

where $K_{pp}$=1.90E-04, $a_{pp}$=0.725 and $K_{ps}$=1.26E-04, $a_{ps}$=0.702.

Polypropylene equivalent molecular weight calculations are performed using Viscotek TriSEC software Version 3.0.

$^{13}$C NMR

The copolymers of this invention typically have substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well known in the art, and are described in, for example, U.S. Pat. No. 5,504,172 and WO 00/01745 that refer to the isotactic sequence in terms of a triad unit in the copolymer molecular chain determined by $^{13}$C NMR spectra. NMR spectra are determined as follows.

$^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}C$ NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer or a JEOL Eclipse 400 NMR Spectrometer, corresponding to a $^{13}C$ resonance frequency of 100.4 or 100.5 MHz, respectively. Acquisition parameters are selected to ensure quantitative $^{13}C$ data acquisition in the presence of the relaxation agent. The data is acquired using gated 1H decoupling, 4000 transients per data file, a 6 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun and periodic vortexing of the tube and contents.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers made with catalyst systems, such as the nonmetallocene, metal-centered, heteroaryl ligand catalyst (described above) the mr region is corrected for ethylene and regio-error by subtracting the contribution from PPQ and PPE. For these propylene-ethylene copolymers the rr region is corrected for ethylene and regio-error by subtracting the contribution from PQE and EPE. For copolymers with other monomers that produce peaks in the regions of mm, mr, and rr, the integrals for these regions are similarly corrected by subtracting the interfering peaks using standard NMR techniques, once the peaks have been identified. This can be accomplished, for example, by analyzing a series of copolymers of various levels of monomer incorporation, by literature assignments, by isotopic labeling, or other means which are known in the art.

For copolymers made using a nonmetallocene, metal-centered, heteroaryl ligand catalyst, such as described in U.S. Patent Publication NO. 2003/0204017, the $^{13}C$ NMR peaks corresponding to a regio-error at about 14.6 and about 15.7 ppm are believed to be the result of stereoselective 2,1-insertion errors of propylene units into the growing polymer chain. In general, for a given comonomer content, higher levels of regio-errors lead to a lowering of the melting point and the modulus of the polymer, while lower levels lead to a higher melting point and a higher modulus of the polymer.

Matrix Method Calculation

For propylene/ethylene copolymers the following procedure can be used to determine the comonomer composition and sequence distribution. Integral areas are determined from the $^{13}C$ NMR spectrum and input into the matrix calculation to determine the mole fraction of each triad sequence. The matrix assignment is then used with the integrals to yield the mole fraction of each triad. The matrix calculation is a linear least squares implementation of Randall's (Journal of Macromolecular Chemistry and Physics, Reviews in Macromolecular Chemistry and Physics, C29 (2&3), 201-317, 1989) method modified to include the additional peaks and sequences for the 2,1 regio-error. Table B shows the integral regions and triad designations used in the assignment matrix. The numbers associated with each carbon indicate in which region of the spectrum it will resonate.

Mathematically the Matrix Method is a vector equation $s=fM$ where M is an assignment matrix, s is a spectrum row vector, and f is a mole fraction composition vector. Successful implementation of the Matrix Method requires that M, f and s be defined such that the resulting equation is determined or over determined (equal or more independent equations than variables) and the solution to the equation contains the molecular information necessary to calculate the desired structural information. The first step in the Matrix Method is to determine the elements in the composition vector f. The elements of this vector should be molecular parameters selected to provide structural information about the system being studied. For copolymers, a reasonable set of parameters would be any odd n-ad distribution. Normally peaks from individual triads are reasonably well resolved and easy to assign, thus the triad distribution is the most often used in this composition vector f. The triads for the E/P copolymer are EEE, EEP, PEE, PEP, PPP, PPE, EPP, and EPE. For a polymer chain of reasonable high molecular weight (>=10,000 g/mol), the $^{13}C$ NMR experiment cannot distinguish EEP from PEE or PPE from EPP. Since all Markovian E/P copolymers have the mole fraction of PEE and EPP equal to each other, the equality restriction was chosen for the implementation as well. The same treatment was carried out for PPE and EPP. The above two equality restrictions reduce the eight triads into six independent variables. For clarity reason, the composition vector f is still represented by all eight triads. The equality restrictions are implemented as internal restrictions when solving the matrix. The second step in the Matrix Method is to define the spectrum vector s. Usually the elements of this vector will be the well-defined integral regions in the spectrum. To insure a determined system the number of integrals needs to be as large as the number of independent variables. The third step is to determine the assignment matrix M. The matrix is constructed by finding the contribution of the carbons of the center monomer unit in each triad (column) towards each integral region (row). One needs to be consistent about the polymer propagation direction when deciding which carbons belong to the central unit. A useful property of this assignment matrix is that the sum of each row should equal to the number of carbons in the center unit of the triad which is the contributor of the row. This equality can be checked easily and thus prevents some common data entry errors.

After constructing the assignment matrix, a redundancy check needs to be performed. In other words, the number of linearly independent columns needs to be greater or equal to the number of independent variables in the product vector. If the matrix fails the redundancy test, then one needs to go back to the second step and repartition the integral regions and then redefine the assignment matrix until the redundancy check is passed.

In general, when the number of columns plus the number of additional restrictions or constraints is greater than the number of rows in the matrix M the system is overdetermined. The greater this difference is the more the system is overdetermined. The more overdetermined the system, the more the Matrix Method can correct for or identify inconsistent data which might arise from integration of low signal to noise (S/N) ratio data, or partial saturation of some resonances.

The final step is to solve the matrix. This is easily executed in Microsoft Excel by using the Solver function. The Solver works by first guessing a solution vector (molar ratios among different triads) and then iteratively guessing to minimize the sum of the differences between the calculated product vector and the input product vector s. The Solver also lets one input restrictions or constraints explicitly.

TABLE B

The Contribution of Each Carbon on the Central Unit of Each Triad Towards Different Integral Regions

| Triad Name | Structure | Region for 1 | Region for 2 | Region for 3 |
|---|---|---|---|---|
| PPP | | L | A | O |
| PPE | | J | C | O |
| EPP | | J | A | O |
| EPE | | H | C | O |
| EEEE | | K | K | |
| EEEP | | K | J | |
| EEP | | M | C | |
| PEE | | M | J | |
| PEP | | N | C | |
| PQE | | F | G | O |

TABLE B-continued

The Contribution of Each Carbon on the Central Unit of Each Triad Towards Different Integral Regions

| Triad Name | Structure | Region for 1 | Region for 2 | Region for 3 |
|---|---|---|---|---|
| QEP | [structure] | F | F | |
| XPPQE | [structure] | J | F | O |
| XPPQP | [structure] | J | E | O |
| PPQPX | [structure] | I | D | Q |
| PQPPX | [structure] | F | B | P |

P = propylene,
E = ethylene,
Q = 2,1 inserted propylene.

| Chemical Shift Ranges | | | | | | | | |
|---|---|---|---|---|---|---|---|---|
| A | B | C | D | E | F | G | H | I |
| 48.00 | 43.80 | 39.00 | 37.25 | 35.80 | 35.00 | 34.00 | 33.60 | 32.90 |
| 45.60 | 43.40 | 37.30 | 36.95 | 35.40 | 34.50 | 33.60 | 33.00 | 32.50 |

| J | K | L | M | N | O | P | Q |
|---|---|---|---|---|---|---|---|
| 31.30 | 30.20 | 29.30 | 27.60 | 25.00 | 22.00 | 16.00 | 15.00 |
| 30.30 | 29.80 | 28.20 | 27.10 | 24.50 | 19.50 | 15.00 | 14.00 |

1,2 inserted propylene composition is calculated by summing all of the stereoregular propylene centered triad sequence mole fractions. 2,1 inserted propylene composition (Q) is calculated by summing all of the Q centered triad sequence mole fractions. The mole percent is calculated by multiplying the mole fraction by 100. C2 composition is determined by subtracting the P and Q mole percentage values from 100.

Example 2

Metallocene Catalyzed:
This example demonstrates calculation of compostion values for propylene-ethylene copolymer made using a metallocene catalyst synthesized according to Example 15 of U.S. Pat. No. 5,616,664. The propylene-ethylene copolymer is manufactured according to Example 1 of US Patent Application 2003/0204017. The propylene-ethylene copolymer is analyzed as follows. The data is collected using a Varian UNITY Plus 400 MHz NMR spectrometer corresponding to a $^{13}$C resonance frequency of 100.4 MHz. Acquisition parameters are selected to ensure quantitative $^{13}$C data acquisition in the presence of the relaxation agent. The data is acquired using gated 1H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150 C with periodic refluxing initiated by heat gun.

Following data collection, the chemical shifts are internally referenced to the mmmm pentad at 21.90 ppm.

For metallocene propylene/ethylene copolymers, the following procedure is used to calculate the percent ethylene in the polymer using the Integral Regions assignments identified in the Journal of Macromolecular Chemistry and Physics, "Reviews in Macromolecular Chemistry and Physics," C29 (2&3), 201-317, (1989).

TABLE 2-A

Integral Regions for Calculating % Ethylene

| Region Designation | Chemical Shift Range/ppm | Integral Area |
|---|---|---|
| A | 44-49 | 259.7 |
| B | 36-39 | 73.8 |
| C | 32.8-34 | 7.72 |
| P | 31.0-30.8 | 64.78 |
| Q | Peak at 30.4 | 4.58 |
| R | Peak at 30 | 4.4 |
| F | 28.0-29.7 | 233.1 |
| G | 26-28.3 | 15.25 |
| H | 24-26 | 27.99 |
| I | 18-23 | 303.1 |

Region D is calculated as follows: D = P − (G − Q)/2.
Region E is calculated as follows: E = R + Q + (G − Q)/2.

Region D is calculated as follows:

$$D = P - (G-Q)/2.$$

Region E is calculated as follows:

$$E = R + Q + (G-Q)/2.$$

The triads are calculated as follows:

TABLE 2-B

Triad Calculation

PPP = (F + A − 0.5D)/2
PPE = D
EPE = C
EEE = (E − 0.5G)/2
PEE = G
PEP = H
Moles P = (B + 2A)/2
Moles E = (E + G + 0.5B + H)/2

As demonstrated above, embodiments of the invention provide a new class of propylene and α-olefin block interpolymers. The block interpolymers are characterized by an average block index of greater than zero, preferably greater than 0.2. Due to the block structures, the block interpolymers have a unique combination of properties or characteristics not seen for other propylene/α-olefin copolymers. Moreover, the block interpolymers comprise various fractions with different block indices. The distribution of such block indices has an impact on the overall physical properties of the block interpolymers. It is possible to change the distribution of the block indices by adjusting the polymerization conditions, thereby affording the abilities to tailor the desired polymers. Such block interpolymers have many end-use applications. For example, the block interpolymers can be used to make polymer blends, fibers, films, molded articles, lubricants, base oils, etc. Other advantages and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A propylene/α-olefin interpolymer comprising (i) a majority mole fraction of polymerized units of propylene and (ii) an α-olefin, wherein the interpolymer is a block interpolymer and is characterized by an average block index in the range from about 0.4 to about 1.0, a molecular weight distribution, $M_w/M_n$, greater than 2.6, and as having one and only one melting point, Tm.

2. The propylene/α-olefin interpolymer of claim 1, wherein the average block index is in the range from greater than 0.4 to about 0.7.

3. The propylene/α-olefin interpolymer of claim 1, wherein the average block index is in the range from about 0.6 to about 0.9.

4. The propylene/α-olefin interpolymer of claim 1, wherein the average block index is in the range from about 0.5 to about 0.7.

5. The propylene/α-olefin interpolymer of claim 1 wherein the interpolymer has a density of less than about 0.89 g/cc.

6. The propylene/α-olefin interpolymer of claim 1 wherein the interpolymer has a density in the range from about 0.85 g/cc to about 0.905 g/cc.

7. The propylene/α-olefin interpolymer of claim 1 wherein the α-olefin is styrene, ethylene, 1-butene, 1-hexene, 1-octene, 4-methyl-1-pentene, norbornene, 1-decene, 1,5-hexadiene, or a combination thereof.

8. The propylene/α-olefin interpolymer of claim 1 wherein the α-olefin is 1-butene.

9. The propylene/α-olefin interpolymer of claim 1 wherein the α-olefin is 1-octene.

10. The propylene/α-olefin interpolymer of claim 1 wherein the Mw/Mn is from greater than 2.6 to about 8.

11. The propylene/α-olefin interpolymer of claim 1 wherein the Mw/Mn is from greater than 2.6 to about 3.5.

12. The propylene/α-olefin interpolymer of claim 1 wherein the propylene/α-olefin interpolymer is characterized by one melting point, Tm, in degrees Celsius, and a comonomer content, in weight %, wherein the numerical values of Tm and α-olefin correspond to the relationship:

$$T_m > -2.909(\text{wt \% } \alpha\text{-olefin}) + 141.57.$$

13. The propylene/α-olefin interpolymer of claim 1 wherein the propylene/α-olefin interpolymer is characterized by an elastic recovery, Re, in percent at 300 percent strain and 1 cycle measured with a compression-molded film of the propylene/α-olefin interpolymer, and a density, d, in grams/cubic centimeter, wherein the numerical values of Re and d satisfy the following relationship when propylene/α-olefin interpolymer is substantially free of a cross-linked phase:

$$Re > 1481 - 1629(d).$$

14. A propylene/α-olefin interpolymer comprising (i) a majority mole fraction of polymerized units of propylene and (ii) an α-olefin, the interpolymer characterized by (i) having at least one fraction obtained by Temperature Rising Elution Fractionation ("TREF"), wherein the fraction has a block index greater than about 0.3 and up to about 1.0, (ii) a molecular weight distribution, $M_w/M_n$, greater than about 2.6, and (iii) having one and only one melting point, Tm.

15. The propylene/α-olefin interpolymer of claim 14 wherein the block index of the fraction is greater than about 0.4.

16. The propylene/α-olefin interpolymer of claim 14 wherein the block index of the fraction is greater than about 0.5.

17. The propylene/α-olefin interpolymer of claim 14 wherein the block index of the fraction is greater than about 0.6.

18. The propylene/α-olefin interpolymer of claim 14 wherein the block index of the fraction is greater than about 0.7.

19. The propylene/α-olefin interpolymer of claim 14 wherein the block index of the fraction is greater than about 0.8.

20. The propylene/α-olefin interpolymer of claim 14 wherein the block index of the fraction is greater than about 0.9.

21. The propylene/α-olefin interpolymer of claim 1 wherein the propylene content is greater than 70 mole percent.

22. The propylene/α-olefin interpolymer of claim 1 wherein the interpolymer comprises one or more hard segments and one or more soft segments.

23. The propylene/α-olefin interpolymer of claim 22 wherein the hard segments are present in an amount from about 5% to about 85% by weight of the interpolymer.

24. The propylene/α-olefin interpolymer of claim 22 wherein the hard segments comprise at least 98% of propylene by weight.

25. The propylene/α-olefin interpolymer of claim 22 wherein the soft segments comprise less than 95% of propylene by weight.

26. The propylene/α-olefin interpolymer of claim 22 wherein the soft segments comprise less than 75% of propylene by weight.

27. The propylene/α-olefin interpolymer of claim 1 or 14 wherein the interpolymer comprises at least 10 hard and soft segments connected in a linear fashion to form a linear chain.

28. The propylene/α-olefin interpolymer of claim 27, wherein the hard segments and soft segments are randomly distributed along the chain.

29. The propylene/α-olefin interpolymer of claim 22 wherein the soft segments do not include a tip segment.

30. The propylene/α-olefin interpolymer of claim 22 wherein the hard segments do not include a tip segment.

31. The propylene/α-olefin interpolymer comprising (i) a majority mole fraction of polymerized units of propylene and (ii) an α-olefin, wherein the interpolymer is a block interpolymer and is characterized by an average block index in the range from about 0.4 to about 1.0 and a molecular weight distribution, $M_w/M_n$, greater than about 1.3 and wherein the propylene/α-olefin interpolymer is characterized as having one and only one melting point, Tm.

* * * * *